United States Patent

Fraas et al.

[11] Patent Number: 6,091,018
[45] Date of Patent: Jul. 18, 2000

[54] THREE-LAYER SOLID INFRARED EMITTER WITH SPECTRAL OUTPUT MATCHED TO LOW BANDGAP THERMOPHOTOVOLTAIC CELLS

[75] Inventors: Lewis M. Fraas, Issaquah; Lucian G. Ferguson, Seattle, both of Wash.

[73] Assignee: JX Crystals Inc., Issaquah, Wash.

[21] Appl. No.: 09/179,094

[22] Filed: Oct. 27, 1998

Related U.S. Application Data

[60] Provisional application No. 60/063,058, Oct. 27, 1997.

[51] Int. Cl.$^7$ ............................................. H01L 31/00
[52] U.S. Cl. ............................................. 136/253
[58] Field of Search ........................... 136/253; 431/115, 431/100

[56] References Cited

U.S. PATENT DOCUMENTS

| | | | |
|---|---|---|---|
| 3,433,676 | 3/1969 | Stein | 136/253 |
| 4,707,560 | 11/1987 | Hottel et al. | 136/253 |
| 4,776,895 | 10/1988 | Goldstein | 136/253 |
| 4,906,178 | 3/1990 | Goldstein et al. | 431/79 |
| 4,976,606 | 12/1990 | Nelson | 431/79 |
| 5,080,724 | 1/1992 | Chubb | 136/253 |
| 5,091,018 | 2/1992 | Fraas et al. | 136/246 |
| 5,096,505 | 3/1992 | Fraas et al. | 136/246 |
| 5,312,521 | 5/1994 | Fraas et al. | 136/253 |
| 5,356,487 | 10/1994 | Goldstein et al. | 136/253 |
| 5,383,976 | 1/1995 | Fraas et al. | 136/253 |
| 5,389,158 | 2/1995 | Fraas et al. | 136/244 |
| 5,401,629 | 3/1995 | Fraas et al. | 136/253 |
| 5,403,405 | 4/1995 | Fraas et al. | 136/253 |
| 5,439,532 | 8/1995 | Fraas | 136/253 |
| 5,512,109 | 4/1996 | Fraas et al. | 136/253 |
| 5,551,192 | 9/1996 | Fraas | 136/253 |
| 5,616,186 | 4/1997 | Fraas et al. | 136/253 |
| 5,651,838 | 7/1997 | Fraas et al. | 136/253 |
| 5,865,906 | 2/1999 | Ferguson et al. | 136/253 |
| 5,942,047 | 8/1999 | Fraas et al. | 136/253 |

OTHER PUBLICATIONS

Fraas, A.P., "Heat Exchanger Design Operating on Radiant Energy," Wiley–Interscience Publication, pp. 365–382, (U.S.A. 1989).

Fraas, A.P., "Characteristics of Heat Sources, Engineering Evaluation of Energy System," pp. 96–125, McGraw–Hill (U.S.A. 1982).

Pelka, D.G. et al., "Natural Gas–Fired Thermophotovoltaic System," Proceedings of the 32nd International Power Sources, pp. 110–123, (U.S.A. 1986).

(List continued on next page.)

*Primary Examiner*—Mark Chapman
*Attorney, Agent, or Firm*—James Creighton Wray; Meera P. Narasimhan

[57] ABSTRACT

A three-layer solid infrared emitter having a spectral output matched to low bandgap TPV cells is provided. The three layers include inner and outer layers, and a core layer between the inner and outer layers. The core layer is of solid fiber reinforced undoped refractory oxide material. The inner layer of siC material absorbs radiation from the radiator, the core layer conducts heat from the inner layer to the outer layer. The core layer is a strengthening layer forming a diffuse reflector for stopping a shine-through of long wavelength radiation from the inner layer thereby preserving spectral selectivity in the outer layer. The emitter material may be cobalt doped, nickel doped, or combination of Ni or Co doped refractory oxides with erbia or a thin erbia selective emitter layer. The TPV generator has two concentric tubes with the emitter forming an outer tube and a radiator or mantle forming an inner tube surrounding a combustion chamber for radiating combustion heat from the chamber to the emitter for infrared emission. One/both concentric tubes may be of SiC acting as a near black body emitter/radiator. A resultant heat input to the inner tube during an upstream flow and a heat input to the inner and outer tubes during a downstream flow are adjustable such that the sun energy to the outer tube is constant along lengths of the outer tube thus maintaining the outer IR emitter tube at a constant temperature. Flow of combustion heat between the radiator or mantle and the emitter may be radial or axial.

25 Claims, 3 Drawing Sheets

OTHER PUBLICATIONS

Morgan, M.D. et al., "Radioisotope Thermal Photovoltaic Application of the GaSb Solar Cell," NASA SPRAT Conference, pp. 349–358, (U.S.A. 1989).

Doellner, O.L., "Aircraft Photovoltaic Power–Generating System," PhD. Thesis (Appendix A), University of Arizona, (U.S.A. 1991).

Fraas, A.P., "Design and Development Tests of Direct–Condensing Potassium Radiators," USAEC Report Conf–651026, (U.S.A. 1965).

Tester, et al., "Comparative Performance Characteristics of Cylindrical Parabolic and Flat Plate Solar Energy Collectors," American Society of Mechanical Engineers, pp. 1–2, (U.S.A. 1974).

Fraas, A.P., "Effects of Directed and Kinetic Energy Weapons on Spacecraft," Oak Ridge National Laboratory, ORNL/TM–9814, pp. 1–76, (U.S.A. 1986).

THREE-LAYER SOLID INFRARED EMITTER WITH SPECTRAL OUTPUT MATCHED TO LOW BANDGAP THERMOPHOTOVOLTAIC CELLS

This application claims the benefit of U.S. Provisional Application No. 60/063,058, filed Oct. 27, 1997.

BACKGROUND OF THE INVENTION

A Cobalt doped refractory oxide infrared emitter with a spectral output band matched to the response band of a GaSb low bandgap cell is described in a copending application Ser. No. 08/702,184, U.S. Pat. No. 5,865,906. That matched emitter/GaSb cell converter pair is well suited for use with hydrocarbon fired thermophotovoltaic generators.

A Co doped refractory oxide solid infrared emitter structure and fabrication sequence in which a Co doped spinel outer layer is formed over a fiber reinforced alumina inner core layer is described in a copending application Ser. No. 08/834,896, U.S. Pat. No. 5,942,047. As described in a copending application, in emitter the fiber reinforced alumina layer provides for strength, durability, and thermal shock resistance.

The use of two concentric tubes in a radiant tube burner configuration as the burner/emitter/recuperator assembly in a TPV generator is described in U.S. Pat. No. 5,439,532.

SUMMARY OF THE INVENTION

A preferred embodiment is a three-layer solid infrared emitter having a spectral output matched to low bandgap TPV cells is provided. The three layers include inner and outer layers, and a core layer between the inner and outer layers Preferably, the core layer is of solid fiber reinforced undoped refractory oxide material. The inner layer is a black layer of SiC material. The inner layer absorbs radiation from the radiator, the core layer conducts heat from the inner layer to the outer layer. The core layer is a strengthening layer forming a diffuse reflector for stopping a shine-through of long wavelength radiation from the inner layer thereby preserving spectral selectivity in the outer layer.

The preferred emitter may be of any suitable material. Preferred material include, but is not limited to, cobalt doped, nickel doped, or combination of Ni or Co doped refractory oxides with erbia or a thin erbia selective emitter layer.

The preferred TPV generator has at least two concentric tubes with the emitter forming an outer tube and a radiator or mantle forming an inner tube. The radiator surrounds a combustion chamber for radiating combustion heat from the chamber to the emitter for infrared emission. One or both the concentric tubes are of SiC material which acts as a near black body emitter/radiator.

A preferred embodiment has an upstream flow of combustion gases in the inside tube towards a top of the inner tube and a downstream flow of combustion gases over the top of the inner tube and downwards between the inner and the outer tubes towards a bottom of the outer tube. The upstream flow causes heat exchange between the gases and the inner tube and the downstream flow causes a heat exchange between the inner tube and the outer tube thereby progressively cooling as the gas flows upstream and downstream.

A resultant heat input to the inner tube during an upstream flow and a heat input to the inner and outer tubes during a downstream flow are adjustable such that; energy to the outer tube is constant along lengths of the outer tube thus maintaining the outer IR emitter tube at a constant temperature. The flow of combustion heat between the radiator or mantle and the emitter may be radial or axial.

These and further and other objects and features of the invention are apparent in the disclosure, which includes the above and ongoing written specification, with the claims and the drawings.

DETAILED DESCRIPTION OF PREFERRED EMBODIMENTS

Figure 1:
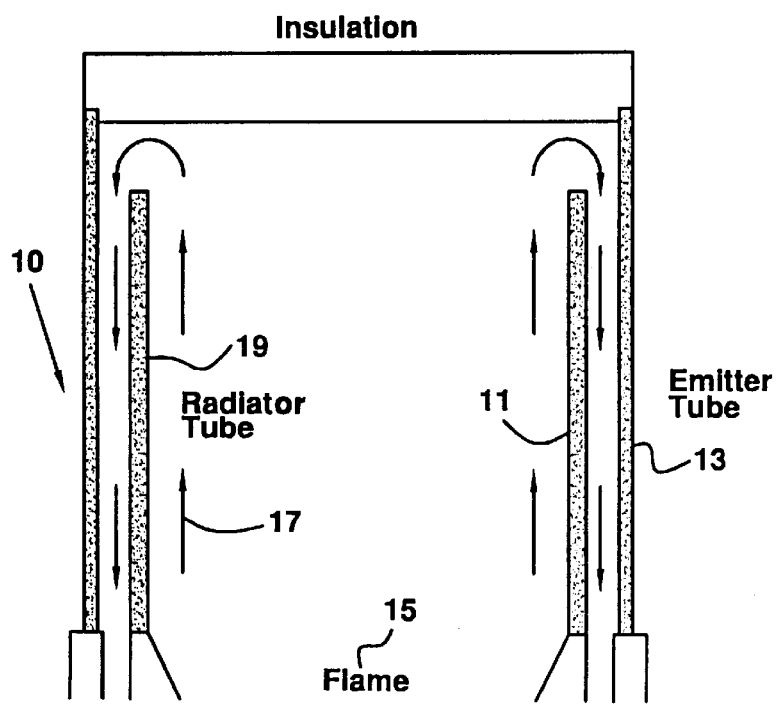
FIG. 1 shows a burner with two concentric tubes, radiator-emitter and an emitter.

In the radiant tube burner configuration 10 shown in FIG. 1, the two concentric tubes are typically fabricated from SiC. The SiC material acts as a near black body emitter/radiator. Referring to FIG. 1, combustion 15 occurs at the bottom of the inside tube. The hot combustion gases 17 flow upward to the top 19 of the inner tube 11 and then turn around and flow downward between the inner and outer tubes. The gases are hottest at the bottom of the inner tube and progressively cooled as they move down stream.

Figure 2:
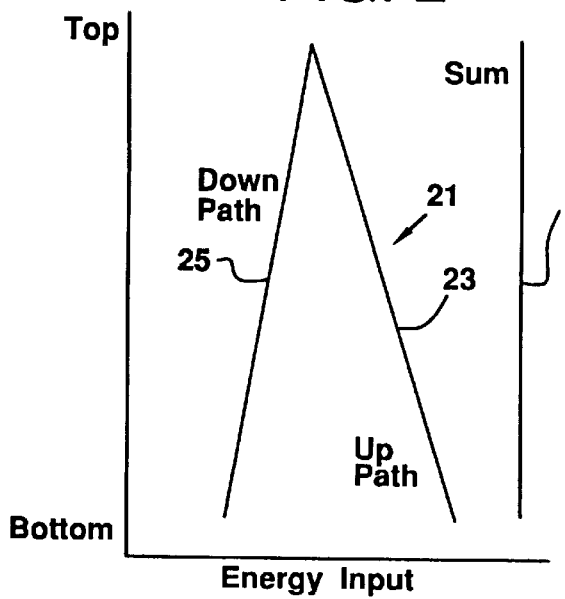
FIG. 2 shows heat transfer to the tubes and the sum of the transfer to the outer emitter tube.

FIG. 2 shows the resultant heat input 21 to the inner tube during the upward pass and to the inner and outer tubes during the downward pass. If the two heat input slopes 23 and 25 are adjusted to be equal but opposite in sign and when the energy from the inner tube radiates across to the outer tube, the sum energy input 27 to the outer tube will be constant along its length. Consequently, the outer IR emitter tube temperature will be nearly constant, which is important for a TPV system. This forms the basis for the invention. Note that in this configuration, the inner tube 11 is the radiator tube and the outer tube 13 the emitter tube.

The four emitter configurations shown in FIG. 3 are possible configurations for use in combustion TPV systems. The four configurations are as follows:

(a) Single emitter 31 with holes 33 for radial flow 35.
(b) Single solid emitter 37 and window 39 with axial flow.
(c) Mantle 41 Emitter 43 with a radial flow 45.
(d) Radiator 47 Emitter 43 with axial flow 49.

The (d) configuration is the radiant tube burner configuration described in the previous paragraph with reference to FIG. 2. This relates to a three layer emitter for use in the FIG. 3 (c) and (d) configurations.

Figure 4:
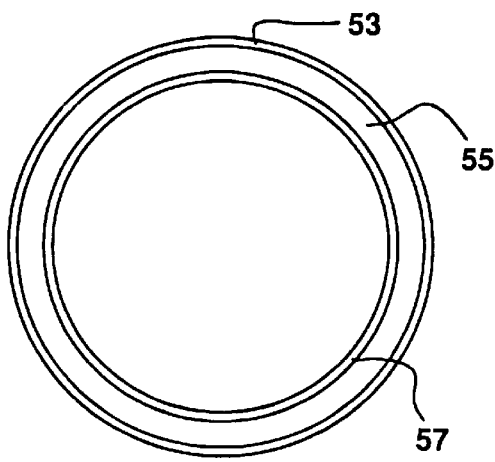
FIG. 4 shows a three-layer emitter.
Figure 3A:
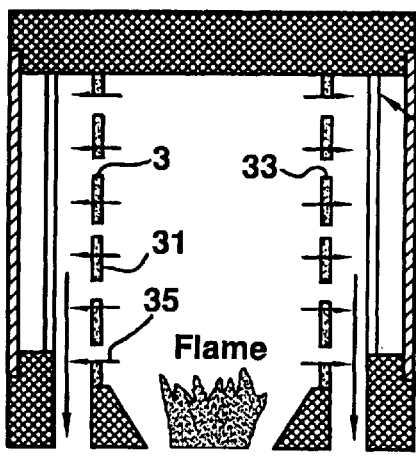
FIGS. 3A, 3B, 3C and 3D show four burner-emitter configurations.
Figure 3B:
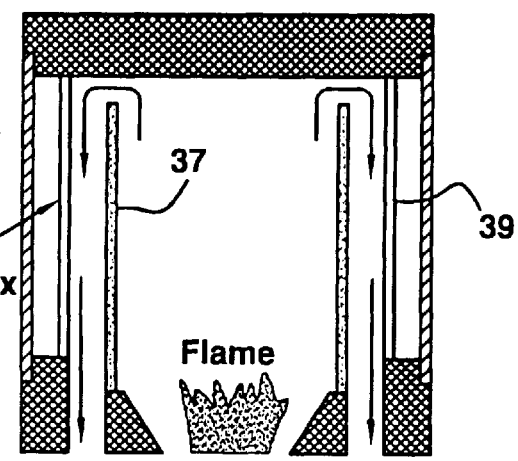
Figure 3C:
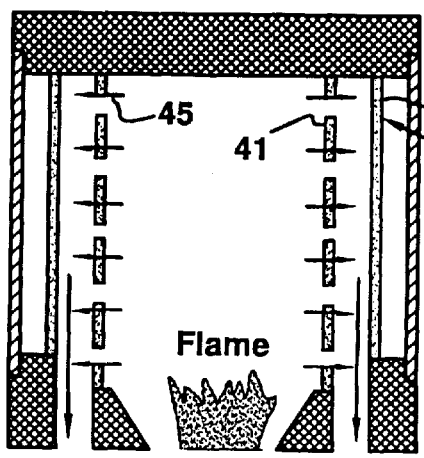
Figure 3D:
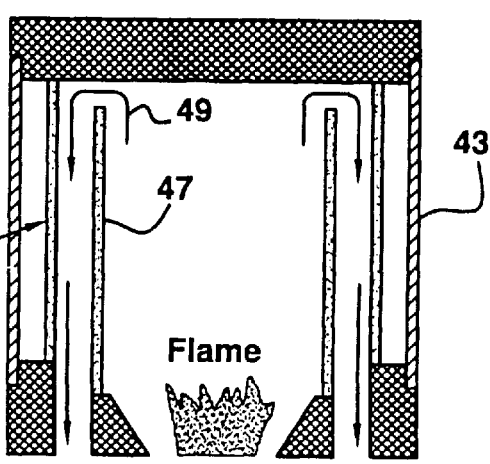

FIG. 4 shows the preferred three-layer emitter structure 51 of the present invention. The outer layer 53 is the selective emitter layer with spectral output matched to the appropriate low bandgap TPV cell. The core layer 55 is a solid fiber reinforced undoped refractory oxide layer. Finally the inner layer 57 is a black layer, nominally SiC.

Each of these three layers serves an important purpose. The inner black layer 57 serves to absorb the infrared radiated from the inner mantle or radiator tubes in the (c) and (d) configurations. The white core layer 55 not only acts as a strengthening layer but now acts as a diffuse reflector layer to stop the shine-through of long wavelength radiation from the black layer which otherwise would destroy the spectral selectivity inherent in the outermost layer. Meanwhile, heat absorbed in the black layer can conduct through the solid white layer to the selective emitter layer.

This three-layer structure 51 was not obvious. We initially tried the two layer structure in the (c) and (d) configurations but found that the emitter did not get very hot while the radiator or mantle tubes did get very hot rising to near the combustion gas temperature.

We initially rejected black coatings inside the matched emitter believing that the blackbody long wavelength radiation would shine through and destroy the emitters selectivity. The three-layer emitter configuration was most preferred after measurements indicated that shine-through was not occurring in the critical 2 to 6 micron infrared region. Having discovered that significant shine-through was not present, it then occurred to us that a black inner coating would make the (c) and (d) configurations viable. Fabrication and testing of these three-layer emitters then proved the (c) and (d) configurations very viable. We were then able to efficiently heat the three-layer emitter to high temperatures and maintain good spectral control.

In the visible, a white layer is a diffuse reflector, and a black layer is absorbing. One can see distinct blue (Cobalt), white, and black layers in cross section. However, the concept turns out to be valid with these materials preferably in the 2 to 6 micron infrared range.

Figure 5:
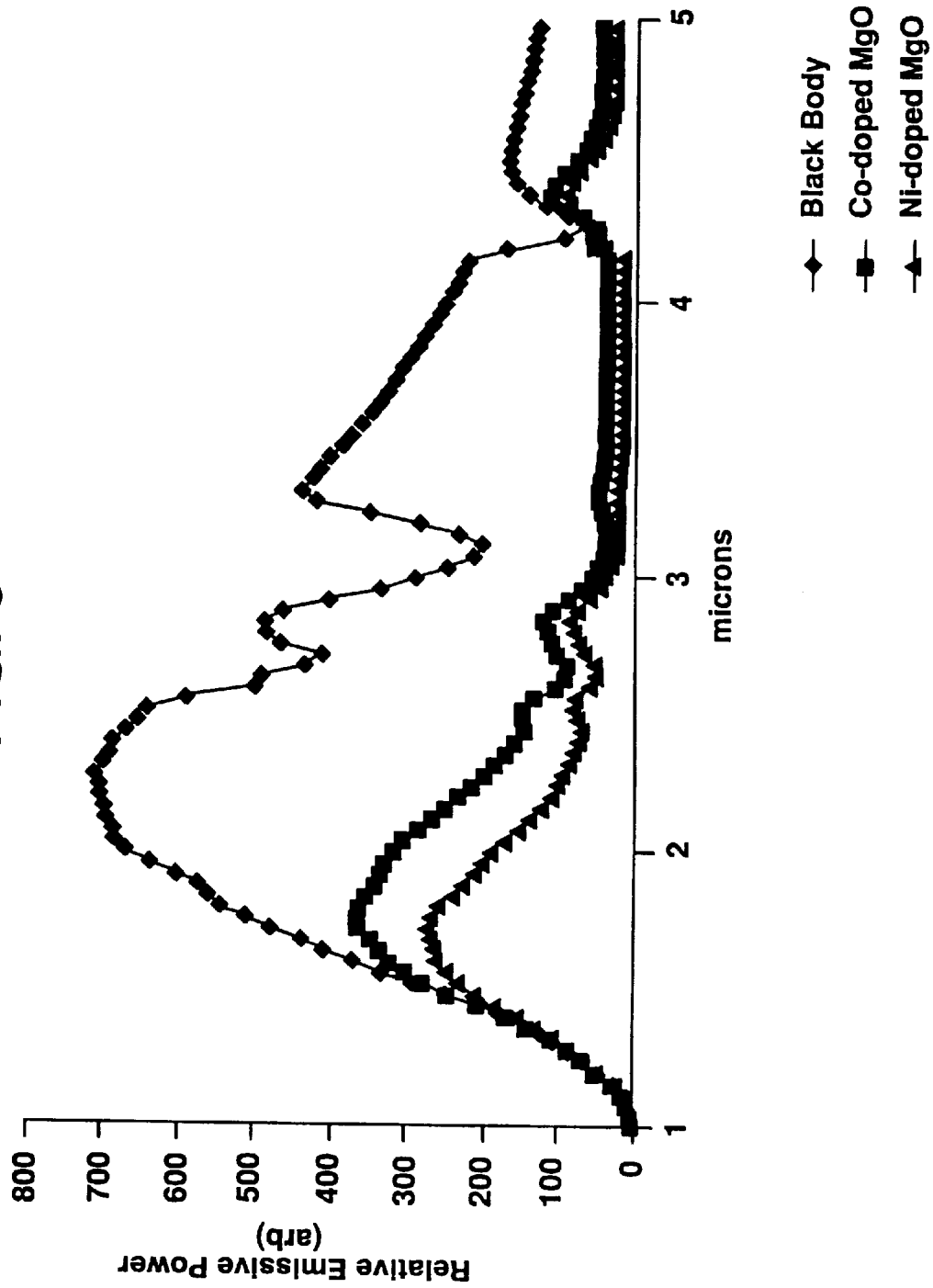
FIG. 5 shows relative emissive power of different emitters.

We also point out here that this three-layer emitter concept can be generalized to include a variety of selective emitter materials in the outer layer in place of the cobalt doped layer we have described previously. For example, Ni doping is also usable as is shown in FIG. 5. A thin erbia selective emitter layer can be used. Combinations of Ni or Co doped refractory oxides with erbia are viable as well.

While the invention has been described with reference to specific embodiments, modifications and variations of the invention may be constructed without departing from the scope of the invention, which is defined in the following claims.

We claim:

1. An infrared emitter having three layers forming an outer layer, a core layer and an inner layer, wherein the inner layer is a black absorptive layer, the core layer is a conductive strenghthening diffuse reflective layer and the outer layer is a selective emitter layer having a spectral output matched to a low bandgap thermophotovoltaic cell.

2. The emitter of claim 1, wherein the core layer is of solid fiber reinforced undoped refractory oxide material.

3. The emitter of claim 2, wherein the black layer is of siC.

4. The emitter of claim 1, further comprising a thermophotovoltaic generator having a combustion chamber for receiving the infrared emitter, a radiator in the combustion chamber for radiating heat, wherein the radiator is concentric with the emitter and spaced from the emitter.

5. The emitter of claim 4, wherein the inner layer absorbs radiation from the radiator, the core layer conducts heat from the inner layer to the outer layer.

6. The emitter of claim 5, wherein the core layer forming the diffuse reflector layer stops a shine-through of long wavelength radiation from the inner layer thereby preserving spectral selectivity in the outer layer.

7. The emitter of claim 5, wherein the shine-through is absent in a 2 to 6 micron infrared region.

8. The emitter of claim 1, wherein the outer layer is selected from a group consisting of emitter material.

9. The emitter of claim 8, wherein the emitter material is cobalt doped material.

10. The emitter of claim 8, wherein the emitter material is a combination of Ni or Co doped refractory oxides with erbia.

11. The emitter of claim 1, wherein the outer layer is an erbia selective emitter layer.

12. The emitter of claim 1, wherein the emitter further comprises openings for radial flow of combustion gases.

13. The emitter of claim 1, wherein the emitter is a solid emitter having a window for axial flow of combustion gases.

14. An infrared emitter having three layers forming an outer layer, a core layer and an inner layer, wherein the outer layer is selected from a group consisting of emitter material, and wherein the emitter material is nickel doped material.

15. A thermophotovoltaic electric generator comprising at least two concentric tubes, an emitter forming an outer tube and a radiator or mantle forming an inner tube, wherein the radiator surrounds a combustion chamber for radiating combustion heat from the chamber to the emitter for infrared emission, wherein the emitter is an infrared emitter having an inner black absorptive layer, a core conductive strenghthening diffuse reflective layer and an outer selective emitter layer having a spectral output matched to a low bandgap thermophotovoltaic cell.

16. The generator of claim 15, wherein one or both the concentric tubes are of SiC material.

17. The generator of claim 16, wherein the SiC material acts as a near black body emitter/radiator.

18. The generator of claim 15, wherein the concentric tubes form inner and outer spaced tubes.

19. The generator of claim 18, further comprising an upstream flow of combustion gases in the inside tube towards a top of the inner tube and a downstreaam flow of combustion gases over the top of the inner tube and downwards between the inner and the outer tubes towards a bottom of the outer tube.

20. The generator of claim 19, wherein the upstream flow causes heat exchange between the gases and the inner tube and the downstream flow causes a neat exchange between the inner tube and the outer tube thereby progressively cooling as the gas flows upstream and downstream.

21. The generator of claim 20, wherein a resultant heat input the inner tube during the upstream flow and a heat input to the inner and outer tubes during the downstream flow are adjustable.

22. The generator of claim 21, wherein the heat inputs are adjusted such that the sun energy to the outer tube is constant along lengths of the outer tube, and wherein the outer infrared emitter tube is maintained at a constant temperature.

23. The generator of claim 15, further comprising a radial flow of combustion heat between the radiator or mantle and the emitter.

24. The generator of claim 15, further comprising an axial flow of combustion neat between the radiator and the emitter.

25. The generator of claim 24, wherein the radiator and is a emitter radiant tube burner.

* * * * *